(12) United States Patent
Wang et al.

(10) Patent No.: US 11,555,700 B2
(45) Date of Patent: Jan. 17, 2023

(54) QUICK FIXING DEVICE FOR MEASURING TUNNEL PERIPHERAL CONVERGENCE AND APPLICATION METHOD THEREOF

(71) Applicant: CHANG'AN UNIVERSITY, Shaanxi (CN)

(72) Inventors: Yaqiong Wang, Shaanxi (CN); Rui Ren, Shaanxi (CN); Jie Li, Shaanxi (CN); Yiwei Cui, Shaanxi (CN); Zhifeng Wang, Shaanxi (CN); Fuxiang Chen, Shaanxi (CN); Longlong Chen, Shaanxi (CN); Haotian Guo, Shaanxi (CN)

(73) Assignee: CHANG'AN UNIVERSITY, Xi'an (CN)

( * ) Notice: Subject to any disclaimer, the term of this patent is extended or adjusted under 35 U.S.C. 154(b) by 679 days.

(21) Appl. No.: 16/680,029

(22) Filed: Nov. 11, 2019

(65) Prior Publication Data
US 2020/0182615 A1  Jun. 11, 2020

(30) Foreign Application Priority Data

Dec. 5, 2018 (CN) .......................... 201811481162.6

(51) Int. Cl.
*G01C 15/00* (2006.01)
*G01B 11/16* (2006.01)
(Continued)

(52) U.S. Cl.
CPC ............ *G01C 15/002* (2013.01); *G01B 11/16* (2013.01); *G01B 11/26* (2013.01); *G06K 7/1417* (2013.01); *G06K 19/06037* (2013.01)

(58) Field of Classification Search
CPC ..... G01C 15/002; G01B 11/16; G06K 7/1417; G06K 19/06037
See application file for complete search history.

(56) References Cited

U.S. PATENT DOCUMENTS

| | | | |
|---|---|---|---|
| 6,781,130 B2* | 8/2004 | Frederick | G01T 1/20 |
| | | | 250/361 R |
| 7,898,661 B2* | 3/2011 | Xu | G01N 21/956 |
| | | | 356/369 |

(Continued)

FOREIGN PATENT DOCUMENTS

| | | |
|---|---|---|
| CN | 103335596 A | 10/2013 |
| CN | 109405815 A | 3/2019 |
| KR | 20170021219 A | 2/2017 |

*Primary Examiner* — Elias Desta

(57) ABSTRACT

The present application relates to tunnel monitoring and measuring, more particularly, to a quick fixing device for measuring a tunnel peripheral convergence and an application method thereof. A right-angle steel sheet includes a first steel sheet and a second steel sheet which are vertically fixed with each other. The fastener vertically penetrates the first steel sheet, and an explosive powder loading portion on a rear end of the fastener is arranged at a side of the second steel sheet. The reinforcing steel sheet is respectively connected to the first steel sheet and the second steel sheet as a reinforcing bar. A through hole is provided on the reinforcing spacer, through which the reinforcing spacer is sleeved on the fastener. The reinforcing spacer is arranged between the explosive powder loading portion on the rear end of the fastener and the first steel sheet.

9 Claims, 7 Drawing Sheets

(51) Int. Cl.
*G01B 11/26* (2006.01)
*G06K 7/14* (2006.01)
*G06K 19/06* (2006.01)

(56) References Cited

U.S. PATENT DOCUMENTS 8,272,562 B2 * 9/2012 Ziegler ................. G09F 3/0335
235/375
2010/0088240 A1 * 4/2010 Ely ..................... G06Q 10/067
705/348

* cited by examiner

QUICK FIXING DEVICE FOR MEASURING TUNNEL PERIPHERAL CONVERGENCE AND APPLICATION METHOD THEREOF

CROSS-REFERENCE TO RELATED APPLICATIONS

This application claims the benefit of priority from Chinese Patent Application No. 201811481162.6, filed on Dec. 5, 2018. The content of the aforementioned application, including any intervening amendments thereto, is incorporated herein by reference in its entirety.

TECHNICAL FIELD

The present application relates to tunnel monitoring and measuring, more particularly, to a quick fixing device for measuring a tunnel peripheral convergence and an application method thereof, which is mainly used for the tunnel peripheral convergence measurement conducted by a total station, and for constructors to observe and obtain information about tunnel cross sections.

BACKGROUND OF THE APPLICATION

In China, the highway transportation industry is booming and the transportation network is continuously expanding, so the constructions for tunnels increase quite rapidly. On-site monitoring and measuring is a main step in the monitoring design and an important part of the New Austrian Tunneling Method that is currently popular in the world. Generally, conditions or information of the surrounding rock stability and the load and deformation of the support can be obtained accurately and timely by the monitoring and measuring, which determines the safety and economy of designs and constructions. The tunnel peripheral convergence is necessarily to be measured during the monitoring and measuring. Specifically, the convergence rate of the peripheral displacement is measured, and the measured data is analyzed and processed on-site, and the analyzed data is timely provided to the constructor, supervisor and owner. Based on the measured data, the surrounding rock stability, surrounding rock structure, deformation and stability of the supports are confirmed and the classification of the surrounding rock is verified, thus ensuring the safety and economy of the construction.

Total stations and various convergence indicators are used in the prior art for measuring the tunnel peripheral displacement. The total station is able to obtain a more comprehensive 3D displacement data of the measuring point and has the advantages such as the quick measurement and high automation for data processing, and operation errors cause little influence. However, the burying of the measuring point is quite complicated when using the total station. Usually, an embedded rebar with a diameter of 22 mm and a length of about 400 mm is needed, and the exposed end of the embedded part is welded with a 50 mm×50 mm steel sheet, where the steel sheet extends along a longitudinal direction of the rebar, and a reflective film is provided on the steel sheet. A drill hole with a depth of 300 mm and a diameter of 42 mm is drilled on the surrounding rock after the tunnel is excavated and the concrete is initially sprayed, and an anchor pile with the reflective film is anchored in the drill hole with the reflective film facing the total station, and the embedded part is ensured to be perpendicular to the surrounding contour. The probe is wrapped with a plastic bag or a waste cement bag before the second spray of the concrete, and after the second spraying of the concrete is completed, the plastic bag or the cement bag is unwrapped and the concrete on the surface is removed to expose the probe.

The burying method of the measuring piles is very inconvenient in the construction and problems are caused thereby. Specifically, after the embedded part is welded, the drill hole needs to be drilled timely to bury the embedded part while protecting the probe. The probe can be exposed after the second spray of the concrete, which means the making and burying of the measuring point are extremely complicated and a heavy workload will be caused for the surveyors, and the burying of the measuring point is extremely inconvenient due to the demand of complicated tools. Such method requires that the burying of measuring point must be synchronized with the on-site construction at all times, where the drill hole must be drilled after the first spray of the concrete and the probe must be protected until the second spray of the concrete is finished, so the surveyors are required to ensure that the burying of the measuring point is synchronous with the construction progress at all time, which is inconvenient. Also, the extremely time-consuming burying of the measuring point greatly affects the construction progress. Moreover, the exposed ends of the measuring piles can be easily damaged due to different lengths, and a reflective film is provided on one side of the steel sheet, and is used for the measurement conducted by the total station, but when the surveyor is behind the steel sheet, the measuring point cannot be clearly observed since the tunnel is dark, and the information of the measuring point cannot be quickly read, such that the operation difficulty increases and the smoothness of the operation is affected.

SUMMARY OF THE APPLICATION

The present application provides a quick fixing device for measuring a tunnel peripheral convergence and an application method thereof to overcome the defects and deficiencies in the prior art, which effectively improves the working efficiency of the operator and the stability of the device, and reduces measurement errors caused by human factors.

Technical solutions of the present application is described as follows to achieve the above object.

A quick fixing device for measuring a tunnel peripheral convergence, comprising: a right-angle steel sheet, a reinforcing steel sheet, a fastener, a reflective film, an information board and a reinforcing spacer;

wherein the right-angle steel sheet comprises a first steel sheet and a second steel sheet which are vertically fixed with each other; the fastener vertically penetrates the first steel sheet, and an explosive powder loading portion on a rear end of the fastener is arranged at a side of the second steel sheet; the reinforcing steel sheet is respectively connected to the first steel sheet and the second steel sheet as a reinforcing bar;

a through hole is provided on the reinforcing spacer, through which the reinforcing spacer is sleeved on the fastener; and the reinforcing spacer is arranged between the explosive powder loading portion on the rear end of the fastener and the first steel sheet;

the reflective film is provided on the other side of the second steel sheet opposite to the fastener, and a rear end of the reflective film extends to the side of the second steel sheet adjacent to the fastener;

the information board is provided on the side of the second steel sheet provided with the reflective film.

The quick fixing device further comprising a historical data QR code, which is provided on the side of the second steel sheet adjacent to the fastener.

The reinforcing steel sheet comprises a first reinforcing steel sheet and a second reinforcing steel sheet which are respectively provided on both sides of the fastener, and both the first reinforcing steel sheet and the second reinforcing steel sheet have a right angle and are fixedly connected to the first steel sheet and the second steel sheet through the right angle.

A length of the fastener is 250-350 mm.

The present invention further provides a method for measuring a tunnel peripheral convergence using the above-mentioned quick fixing device, comprising:

inserting a front end of the fastener of the quick fixing device in a drill hole drilled on an initial support of the tunnel;

rotating a right-angle steel sheet to allow the reflective film and information board facing a tunnel entrance;

shooting, by a fastener gun, the fastener into a surrounding rock, installing the fastener in place, and fixing the right-angle steel sheet;

aligning the reflective film with a total station to measure a position of a measuring point;

lighting the rear end of the reflective film by a lighting device at a position behind the measuring point to obtain a position of a previous measuring point;

positioning a next measuring point according to the position of the previous measuring point; and recording information of the measuring point on the information board.

The quick fixing device for measuring a tunnel peripheral convergence further comprises a historical data QR code, which is provided on a side of the second steel sheet adjacent to the fastener; and the method further comprises:

scanning the historical data QR code to obtain the historical data and convergence tendency of the measuring point.

The step of scanning the historical data QR code to obtain the historical data and convergence tendency at the measuring point comprises:

measuring position data of the measuring point by the total station and calculating a convergence value of the measuring point according to the measured position data; wherein the obtained position data and value of the convergence of the measuring point are inputted into a webpage; the webpage interacts with a backend to write the position data and the convergence value into a database; the historical data QR code is scanned by a user using a QR code scanning function in a browser to scan, and the browser jumps to a query webpage; the query webpage queries in the database according to a logic of the backend; and a query result is displayed on the webpage; and the user reads the historical convergence data and convergence tendency chart of the measuring point on the webpage.

The fastener and the drill hole are in a transition fit.

The drill hole is horizontal.

The present application has the following beneficial effects comparing to the prior art.

In this invention, the fastener vertically penetrates the first steel sheet; the through hole is provided on the reinforcing steel sheet, through which the reinforcing spacer is sleeved on the fastener; and the reinforcing spacer is arranged between the explosive powder loading portion on the rear end of the fastener and the first steel sheet; the reflective film is provided on the other side of the second steel sheet opposite to the fastener, and a rear end of the reflective film extends to the side of the second steel sheet adjacent to the fastener; the information board is provided on the side of the second steel sheet provided with the reflective film. During using, a drill hole is drilled on the initial support of the tunnel, in which the fastener is inserted, and then the fastener is shot into the surrounding rock by the fastener gun, and thus the present invention overcomes the problem of the embedded part being difficult to be buried and the long construction time, and the complicated processes such as the welding of the steel sheet are avoided. The operating efficiency of surveyor is improved and the existing technical problems are overcome. Moreover, the quick fixing device of the present application is low in cost, simple and practical. The reinforcing steel sheet is respectively connected to the first steel sheet and the second steel sheet as a reinforcing bar, which reinforces the right angle of the right-angle steel sheet to prevent the right-angle steel sheet from being damaged due to the on-site construction. In addition, the reinforcing spacer is sleeved on the fastener through the through hole and is arranged between the explosive powder loading portion on rear end of the fastener and the first steel sheet, which prevents the right-angle steel sheet from being penetrated to ruin the device by the fastener, thus greatly improving the work efficiency and saving time. The reflective film is provided on the other side of the second steel sheet opposite to the fastener, and a rear end of the reflective film extends to the side of the second steel sheet adjacent to the fastener, where the rear end of the reflective film is located at the side of the second sheet opposite to the total station, so that the position of the measuring point may be easily observed by the surveyor using a flashlight, which improves the work efficiency and helps the surveyor to position the next measuring point. The information board is provided on the right-angle steel sheet in the present application to record important information such as the measurement date, pile number and construction unit, and the relevant information are able to be easily accessed by the surveyor, constructor and owner, so the relevant information can be conveniently recorded, leading a more convenient on-site construction.

Further, the historical data QR code is stuck on the side of the right-angle steel sheet having the rear end of the reflective film, and the historical data and convergence tendency chart of the measuring point can be obtained by the surveyor by scanning the historical data QR code, such that the historical convergence data and convergence tendency of the measuring point may be more visually shown. The historical data QR code is prevented from the damage by being provided on the side of the second steel sheet adjacent to the fastener.

According to the beneficial effects of the above-mentioned quick fixing device of the present application, the method for measuring the tunnel peripheral convergence of the present invention can effectively improve the working efficiency of the operator and the stability of the device, and reduce measurement errors due to human factors.

REFERENCE NUMERALS

Figure 1:
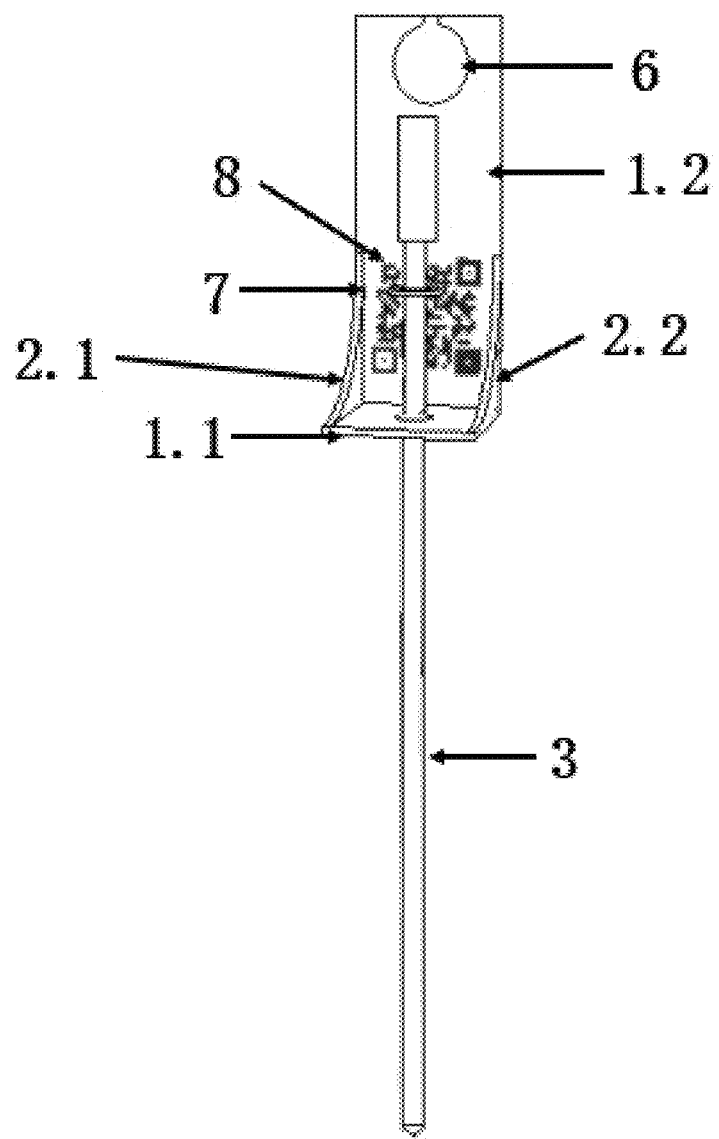
FIG. 1 is a schematic diagram of a quick fixing device of the present application.

1, right-angle steel sheet; 1.1, first steel sheet; 1.2, second steel sheet; 2, reinforcing steel sheet; 2.1, first reinforcing steel sheet; 2.2, second reinforcing steel sheet; 3, fastener; 4, reflective film; 5, information board; 6, rear end of reflective film; 7, reinforcing spacer; 8, historical data QR code.

DETAILED DESCRIPTION OF EMBODIMENTS

The present application will be further described with reference to the accompanying drawings and embodiments.

As shown in FIGS. 1-9, in this embodiment, illustrated is a quick fixing device for measuring a tunnel peripheral convergence, comprising: a right-angle steel sheet 1, a reinforcing steel sheet 2, a fastener 3, a reflective film 4, an information board 5, a reinforcing spacer 7 and a historical data QR code 8; the right-angle steel sheet 1 comprises a first steel sheet 1.1 and a second steel sheet 1.2 which are vertically fixed with each other and are made of flat steel plates. The fastener 3 is vertically penetrates the first steel sheet 1.1, and an explosive powder loading portion on a rear end of the fastener 3 is arranged at a side of the second steel sheet 1.2. The reinforcing steel sheet 2 is connected to the first steel sheet 1.1 and the second steel sheet 1.2 as a reinforcing bar. A through hole is provided on the reinforcing spacer 7, through which the reinforcing spacer 7 is sleeved on the fastener 3, and the reinforcing spacer is arranged between the explosive powder loading portion on the rear end of the fastener 3 and the first steel sheet 1.1. The reflective film 4 is provided on the other side of the second steel sheet 1.2 opposite to the fastener 3, and the rear end of the reflective film 4 extends to the side of the second steel sheet 1.2 adjacent to the fastener 3. The information board 5 is provided on the side of the second steel sheet 1.2 provided with the reflective film 4; and the historical data QR code 8 is provided on the side of the second steel sheet 1.2 provided with the rear end of the reflective film 4. The reinforcing steel sheet 2 comprises a first reinforcing steel sheet 2.1 and a second reinforcing steel sheet 2.2 which are respectively provided on two sides of the fastener 3, and both the first reinforcing steel sheet 2.1 and the second reinforcing steel sheet 2.2 have a right angle and are fixedly connected to the first steel sheet 1.1 and the second steel sheet 1.2 through the right angle.

During using, the fastener 3 may be shot by a fastener gun after the spray onto the initial support is finished rather than finishing processes such as the first and second concrete spray, such that the time and labor are greatly saved while the burying becomes more convenient for the surveyors. The right-angle steel sheet 1 is provided at the fastener 3, and the right-angle steel sheet 1 can be fixed at an outer side of the initial support after the fastener 3 is shot into the surrounding rock, which allows the reflective film, the information board and the historical data QR code to be mounted and adhered, providing a convenient observation for the surveyors. Meanwhile, the complicated construction process is avoided since the steel sheet is no longer needed to be welded on the embedded rebar, which efficiently shortens the working time. The reflective film is provided on the right-angle steel sheet and facing the total station for the surveyors to conduct the measurement. In addition, a slender rear end extends from a side of the square reflective film used for the aiming of the total station to the side of the right-angle steel sheet opposite to the total station, such that the surveyors are able to see the specific position of the measuring point clearly with the flashlight from a place behind of the measuring point, enabling the work more convenient for the surveyors. The information board of the present application is sticky and is stuck on the right-angle steel sheet and beside the reflective film. After the measuring point is installed, information of the measuring point such as pile number, construction unit and the measurement date, etc. is recorded on the information board that can be read by the surveyors later on to avoid mistakes. The mileage information is also provided to the constructor on-site and owner by the information board, facilitating the construction.

The historical data QR code is also sticky and is stuck on the right-angle steel sheet and beside the rear end of the reflective film, and the historical convergence data of the measuring point can be obtained by the surveyors immediately after scanning the QR code. Specifically, the length of the fastener is 250-350 mm, and at an initial stage of the fixing, the right-angle steel sheet is positioned 100 nm away from the rear end of the fastener. A drill hole with the depth of about the length of the front end of the fastener is drilled on the initial support, and the front end of the fastener is inserted into the drill hole, and the fastener is then shot in the surrounding rock by the fastener gun, such that a sufficient burial depth of the fastener is guaranteed, ensuring the accuracy of each measurement and reducing the measurement error. In addition, the diameter of the drill hole may be slightly larger than the diameter of the fastener, ensuring the stability of the fastener and the measuring point not to be damaged by the on-site construction. The fastener with the right-angle steel sheet is provided with a spacer (i.e. the reinforcing spacer 7) between the explosive powder loading portion and the right-angle steel sheet. A fastener gun with large power and a great amount of the explosive powder is needed since the fastener needs to be shot rather deep into the surrounding rock, so the right-angle steel sheet may be penetrated by the fastener and falls off Therefore, by providing the spacer, the pressure on the right-angle steel sheet is reduced and the falling of the right-angle steel sheet is effectively prevented, and thus the construction is safer and the installation of the measuring point is more efficient.

Figure 5:
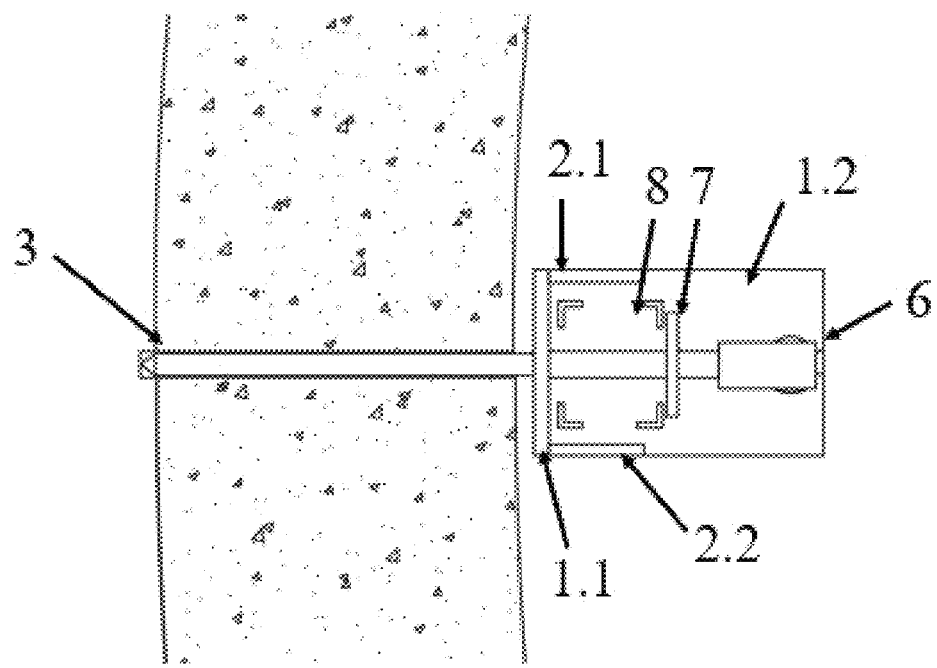
FIG. 5 is a rear view of the quick fixing device of the present application, in which the quick fixing device is initially installed.
Figure 6:
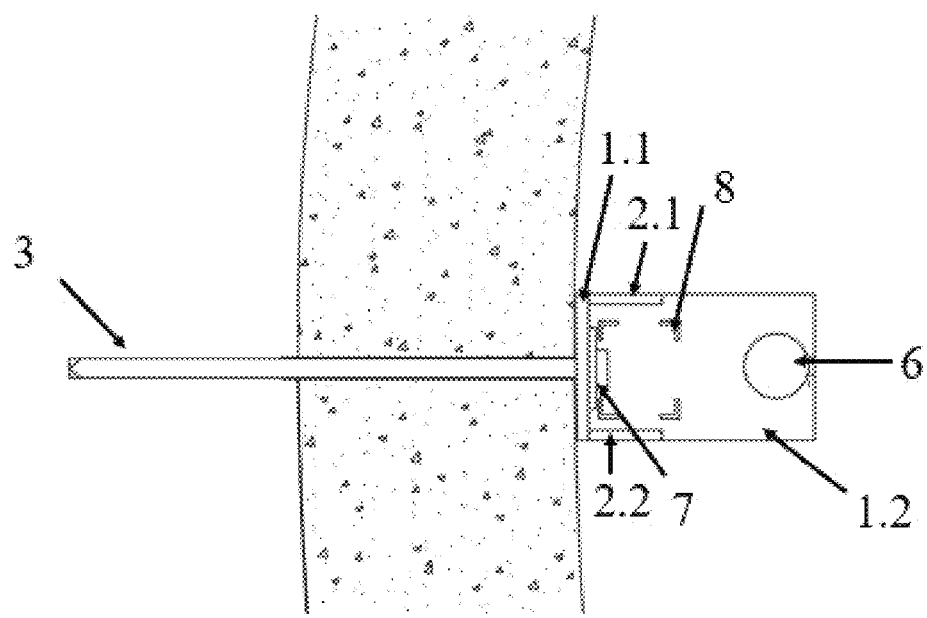
FIG. 6 shows the rear view of the quick fixing device of the present application, in which the quick fixing device is completely installed.
Figure 7:
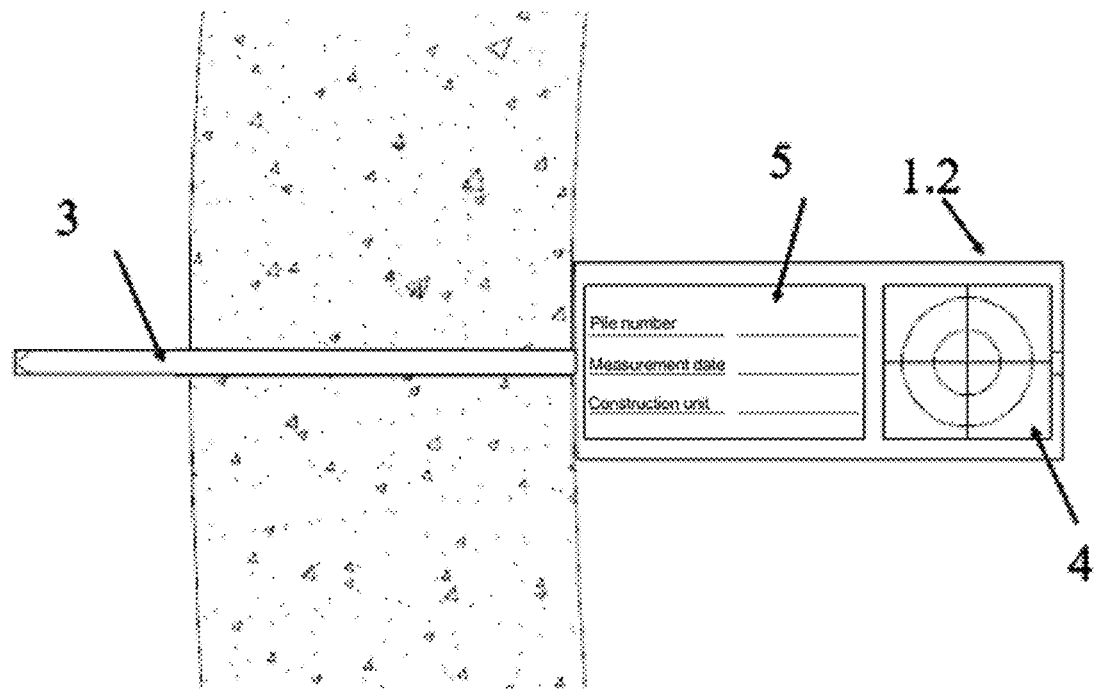
FIG. 7 is a front view of the quick fixing device of the present application, in which the quick fixing device is completely installed.
Figure 8:
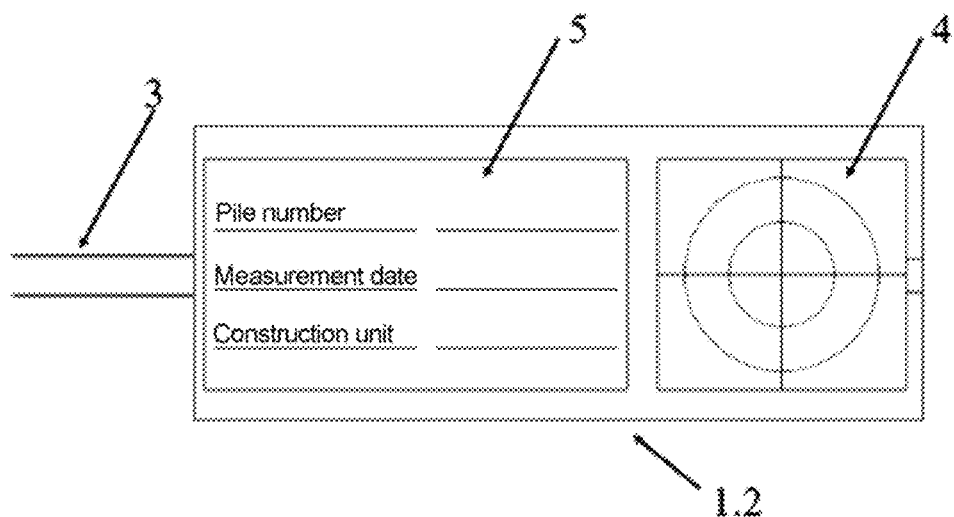
FIG. 8 is a front view of an upper portion of the quick fixing device of the present application.

As shown in FIGS. 5-7, the method for measuring the tunnel peripheral convergence using the quick fixing device of the present application comprises the following steps. The front end of the fastener 3 of the quick fixing device is inserted into the drill hole drilled on the initial support of the tunnel, where the drill hole is horizontal and is in transition fit with the fastener 3; the right-angle steel sheet 1 is rotated to allow the reflective film 4 and the information board 5 to face the tunnel entrance (as shown in FIG. 5); the fastener 3 is shot into the surrounding rock by the fastener gun and installed in place, and the right-angle steel sheet 1 is fixed (as shown in FIGS. 6-7); the total station is aligned with the reflective film 4 to measure the measuring point (as shown in FIG. 8); the position of the previous measuring point is obtained by lighting the rear end of the reflective film 4 from the position behind the measuring point using the flashlight, and the next measuring point is positioned according to the position of the previous measuring point; the information of the measuring point is recorded on the information board; and the historical convergence data and the convergence tendency chart may be obtained by scanning the historical data QR code 8.

Figure 2:
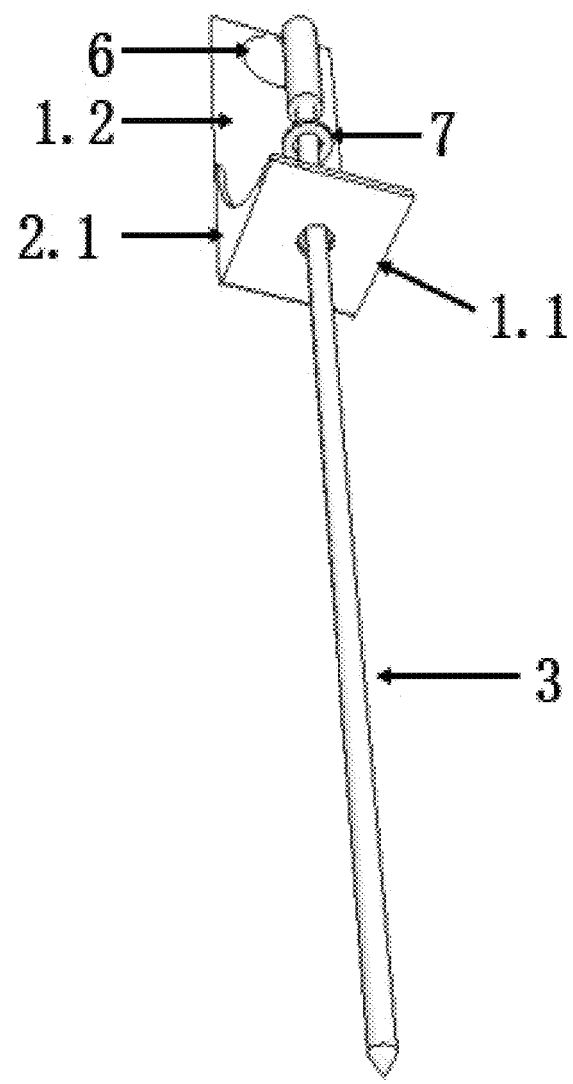
FIG. 2 is a perspective view from the bottom of the quick fixing device of the present application.
Figure 3:
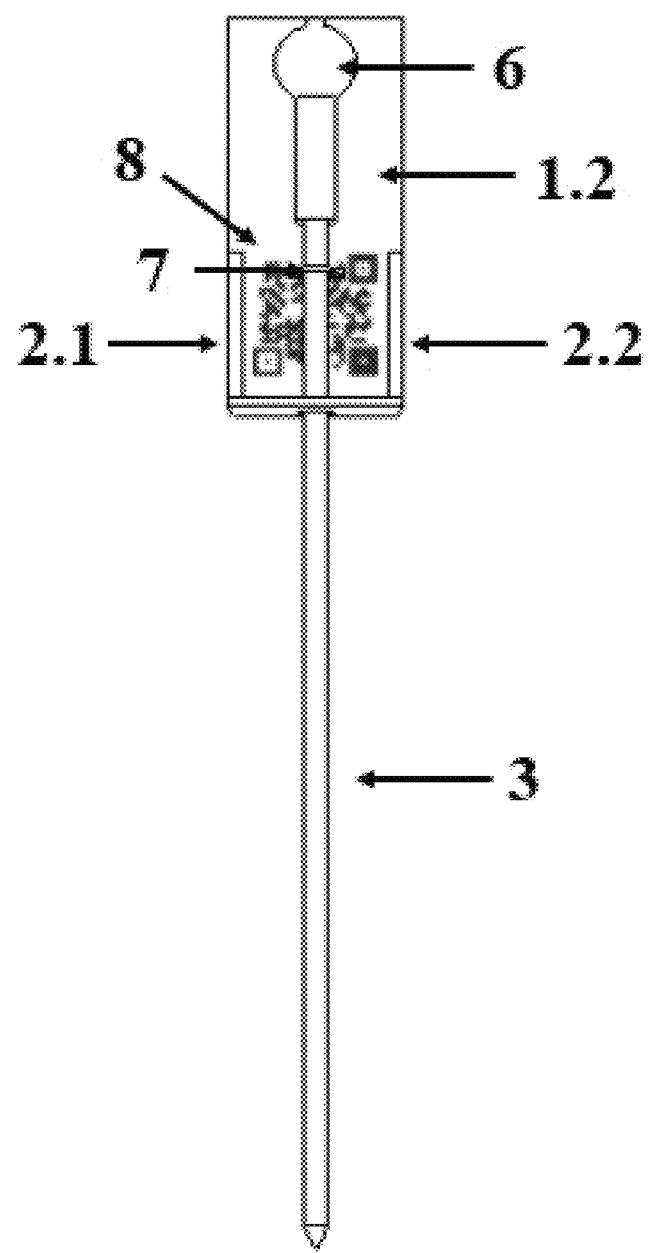
FIG. 3 is a front view of the quick fixing device of the present application.
Figure 4:
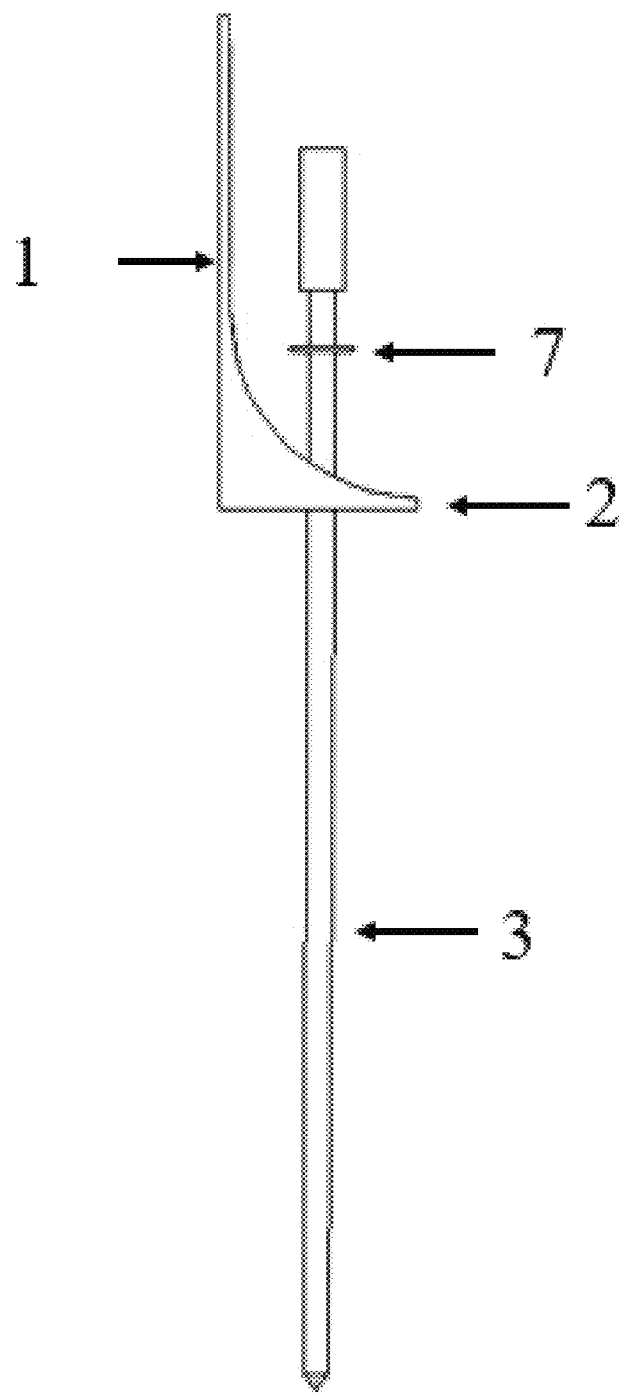
FIG. 4 is a side view of the quick fixing device of the present application.

More specifically, as shown in FIGS. 2 and 5, the front end of the fastener 3 is firstly inserted in the drill hole drilled by an electric drill on the initial support of the tunnel when using the quick fixing device of the present application, where the drill hole should be as horizontal as possible and have an appropriate diameter to ensure the drill hole is not to be too large), such that the shaking of the inserted part of the fastener 3 of the measuring device is avoided.

After the initial installation of the fastener 3, as shown in FIGS. 1 and 3-5, the right angle steel sheet 1 is sleeved on the fastener 3 and is then rotated to allow the reflective film 4 and the information board 5 to face the tunnel entrance, that is, the direction of the total station, so that the observation can be conducted by the total station.

The explosive powder loading portion on the rear end of the fastener 3 is inserted in the fastener gun, and the fastener 3 is shot into the surrounding rock using the gas generated by launching the blank as the power, and the steel sheet is fixed by a friction created by the pressing of the first steel sheet 1.1 and the concrete of the initial support, and the second steel sheet is guaranteed not to rotate to allow the reflective film 4 and the information board 5 to face the tunnel entrance at all time.

As shown in FIGS. 6-9, the strength of the right-angle steel sheet is reinforced by the first reinforcing steel sheet 2.1 and the second reinforcing steel sheet 2.2, which prevents the second steel sheet 1.2 from being damaged by the on-site construction after fixed by the fastener 3. At the same time, the provided reinforcing spacer 7 prevents the first steel sheet 1.1 from being penetrated to ruin the device by the fastener 3 due to the excessive power, thereby improving the work efficiency.

Figure 9:
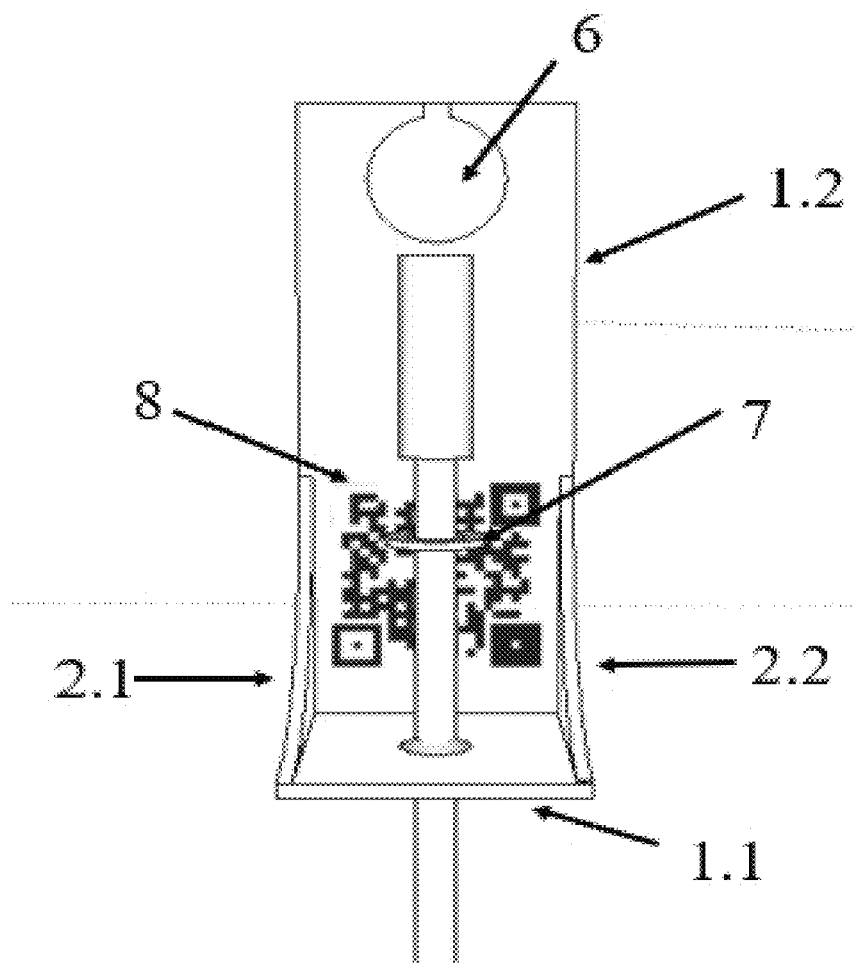
FIG. 9 is a schematic diagram showing a rear of the upper portion of the quick fixing device of the present application.

As shown in FIGS. 8-9, the surveyors can measure the position of the measuring point accurately by aligning the total station with the reflective film 4. At the same time, the position of the measuring point can be easily obtained by the surveyors using a flashlight to light the rear end 6 of the reflective film from the position behind of the measuring point, which is convenient for the surveyors to position the next measuring point, and the working efficiency is greatly improved thereby. The pile number, measurement date and construction unit of the measuring point are recorded on the information board 5, and the historical data QR code 8 is directed to a webpage storing the historical convergence data of the measuring point, so the mentioned information can be easily obtained by the surveyors and the constructors, so that the measurement can be conducted more accurately. The position data of the measuring point is measured by the surveyor using the total station, and the convergence value of the measuring point is calculated according to the measured position data, and the position data and the convergence value of the measuring point are inputted into the webpage, which is interacted with a backend through the HTTP request, and the data is written into the database; with the QR code scanning function of the browser, the historical data QR code is scanned by the surveyors in a browser which then jumps to a query webpage, and the query webpage queries in the database according to the backend logic, and the query result is displayed on the webpage, such that the historical convergence data and convergence tendency chart can be easily queried after the QR code is scanned, and the relevant data can be easily read by the users to judge the construction situation more accurately.

In summary, the quick fixing device of the present application has the advantages of simple operation, safe construction, and is economical and practical. The quick fixing device of the present invention effectively overcomes the existing technical problems in measuring the tunnel peripheral convergence, for example, the measuring point is complicated to be buried, inconvenient to be observed and easy to be destroyed, and the information of the measuring point is difficult to be visually obtained, thereby improving the work efficiency of the surveyors and ensuring the accuracy and reliability of the on-site measurement.

What is claimed is:

1. A quick fixing device for measuring a tunnel peripheral convergence, comprising:
   a right-angle steel sheet,
   a reinforcing steel sheet,
   a fastener,
   a reflective film,
   an information board, and
   a reinforcing spacer;
   wherein the right-angle steel sheet comprises a first steel sheet and a second steel sheet which are vertically fixed with each other; the fastener vertically penetrates the first steel sheet, and an explosive powder loading portion on a rear end of the fastener is arranged at a side of the second steel sheet; the reinforcing steel sheet is respectively connected to the first steel sheet and the second steel sheet as a reinforcing bar;
   a through hole is provided on the reinforcing spacer, through which the reinforcing spacer is sleeved on the fastener; and the reinforcing spacer is arranged between the explosive powder loading portion on the rear end of the fastener and the first steel sheet;
   the reflective film is provided on the other side of the second steel sheet opposite to the fastener, and a rear end of the reflective film extends to the side of the second steel sheet adjacent to the fastener; and
   the information board is provided on the side of the second steel sheet provided with the reflective film.

2. The quick fixing device of claim 1, further comprising a historical data included in quick reference (QR) code which is provided on the side of the second steel sheet adjacent to the fastener.

3. The quick fixing device of claim 1, wherein the reinforcing steel sheet comprises a first reinforcing steel sheet and a second reinforcing steel sheet which are respectively provided on both sides of the fastener, and both the first reinforcing steel sheet and the second reinforcing steel sheet have a right angle and are fixedly connected to the first steel sheet and the second steel sheet through the right angle.

4. The quick fixing device of claim 1, wherein a length of the fastener is 250-350 mm.

5. A method for measuring a tunnel peripheral convergence using the quick fixing device of claim 1, comprising:
   inserting a front end of the fastener of the quick fixing device into a drill hole drilled on an initial support of the tunnel;
   rotating the right-angle steel sheet to allow the reflective film and the information board to face a tunnel entrance;
   shooting, by a fastener gun, the fastener into a surrounding rock; installing the fastener in place; and fixing the right-angle steel sheet;

aligning the reflective film with a total station to measure a position of a measuring point;

lighting the rear end of the reflective film by a lighting device at a position behind the measuring point to obtain a position of a previous measuring point;

positioning a next measuring point according to the position of the previous measuring point; and recording information of the measuring point on the information board.

6. The method of claim 5, wherein the quick fixing device comprises a historical data included in quick reference (QR) code which is provided on a side of the second steel sheet adjacent to the fastener; and the method further comprises:

scanning the historical data included in quick reference (QR) code to obtain the historical data and convergence tendency of the measuring point.

7. The method of claim 6, wherein the step of scanning the QR code of historical data to obtain the historical data and convergence tendency at the measuring point comprises:

measuring position data of the measuring point by the total station and calculating a convergence value of the measuring point according to the measured position data;

wherein the obtained position data and the convergence value of the measuring point are inputted into a webpage; the webpage interacts with a backend to write the position data and the convergence value into a database; the historical data included in quick reference (QR) code is scanned by a user using a QR code scanning function in a browser, and the browser jumps to a query webpage; the query webpage queries in the database according to a logic of the backend, and a query result is displayed on the webpage; and the user reads historical convergence data and convergence tendency chart of the measuring point on the webpage.

8. The method of claim 5, wherein the fastener and the drill hole are in a transition fit.

9. The method of claim 5, wherein the drill hole is horizontal.

* * * * *